(No Model.)
M. B. RYAN & P. WARD.
TREE PROTECTOR.
No. 490,309. Patented Jan. 24, 1893.
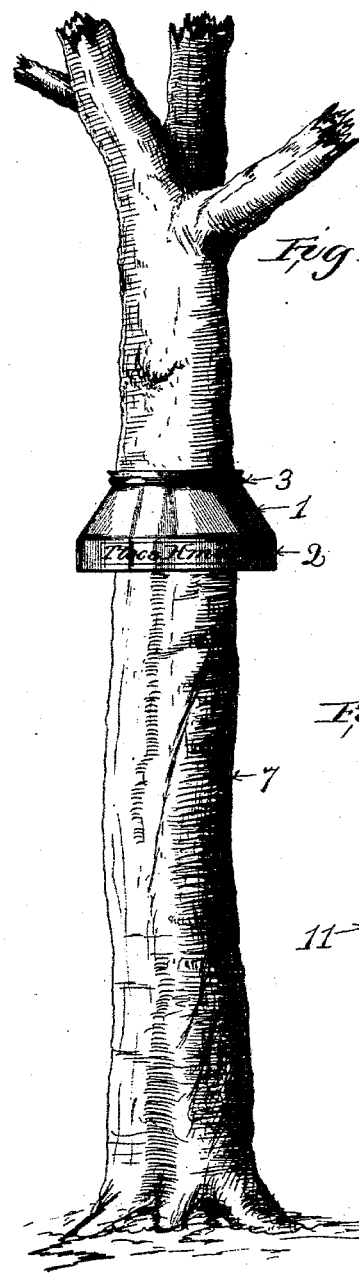
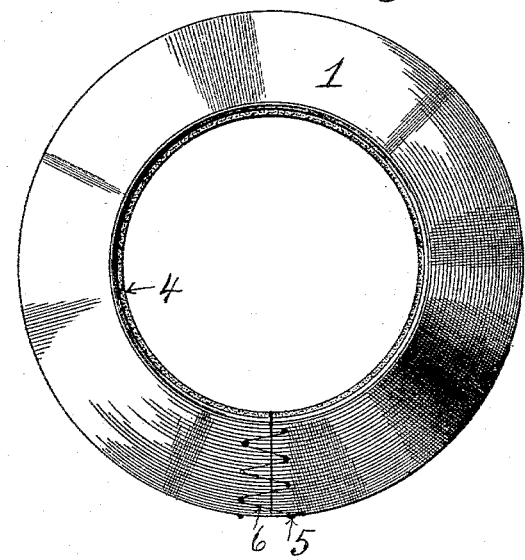
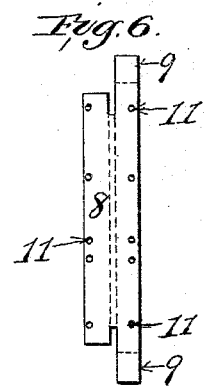
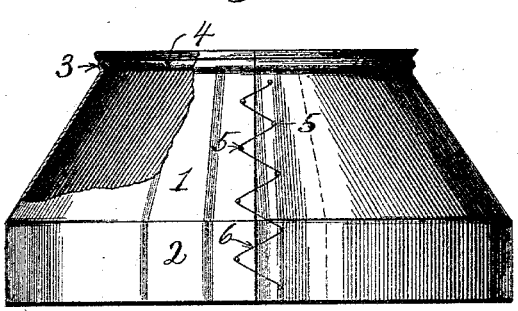
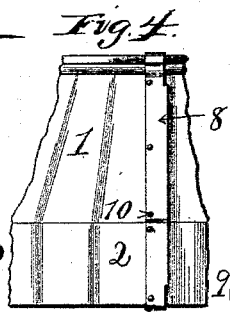
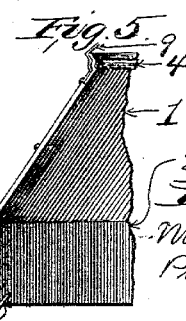
Witnesses:
W. W. Byrne
Inventors:
Michael B. Ryan
Pleasant Ward
By Alfred Ramel Atty

United States Patent Office.

MICHAEL B. RYAN, OF ST. LOUIS, MISSOURI, AND PLEASANT WARD, OF MADISON, ILLINOIS.

TREE-PROTECTOR.

SPECIFICATION forming part of Letters Patent No. 490,309, dated January 24, 1893.

Application filed April 12, 1892. Serial No. 428,859. (No model.)

*To all whom it may concern:*

Be it known that we, MICHAEL B. RYAN, residing in the city of St. Louis and State of Missouri, and PLEASANT WARD, residing at Madison, in the county of Madison and State of Illinois, citizens of the United States, have invented a certain new and useful Tree-Protector, of which the following is a full, clear, and exact description.
Our invention relates to an improved device to be applied to the trunks of trees to present a barrier to caterpillars and insects in ascending the same.

It has for its object a convenient and easily applied device, one that is adjustable, to limited degree, for different sized trees, neat in appearance and cheaply constructed.

It consists in the hereinafter described device and in the means of securing the same on the tree.

The accompanying drawings, in which like numerals of reference denote like parts in the several figures, illustrate our device.

Figure 1 is an elevational view of a trunk of a tree with our device attached; Fig. 2 is a plan view of our device; Fig. 3 is a side elevation of the same, with part broken away to show the packing placed between the upper edge of the device and the tree when it is applied; and Figs. 4, 5 and 6 are views illustrative of a modification of the means for securing the ends of the device together, when the same is secured around a tree, Fig. 4 being a side elevation, as in Fig. 3, of the joint, Fig. 5 an edge view of the end to which the fastening strip is attached, and Fig. 6 is a plan view of the strip itself before being applied to the protector.

The device, as a whole, in shape, consists in two distinct portions 1 and 2, the former corresponding to the surface of the frustum of a cone, and the other or lower part to a short cylinder. The upper edge of the part 1 is formed with an inwardly-facing concave groove 3, in which is secured, when the device is applied to a tree, the cord of cotton 4, or other material of similar character suitable for packing. The lower edge of the part 1 is secured to the part 2, or when preferably made according to our improved method, as hereinafter described, integral with the same.

The device is, as illustrated, preferably composed of one piece or strip circumferentially, and each of the two consequent contiguous edges, when made to encircle the tree 7, as illustrated in Fig. 1, is provided with knobs or buttons 5 around which a cord or wire 6 is laced and drawn taut until the upper edge of the device makes the packing snugly hug the tree, the edges of the protector over-lapping, as shown in dotted lines in Fig. 3.

As another, and in some instances an advantageous, means for securing the two ends of the protector together, when placed as shown in Fig. 1, we make use of the device illustrated in Fig. 6, which consists in a strip 8 of metal, preferably copper or some other correspondingly non-corrosive metal, made of a length, in the main, corresponding to the width of the strip forming the protector 1—2, with longitudinally extending ears 9, at either end, of a convenient length and of a width corresponding, approximately, to one-half of the width of the strip. In application, the strip 8 is doubled over one end of the strip forming the protector, as illustrated in Figs. 4 and 5, and secured thereon by the rivets 10, holes 11 for which have been formed in the strip 8. When the protector has been placed around the tree, as shown in Fig. 1, and the ends brought together, as shown in Figs. 3 and 4, the ears 9 of the strip 8 are doubled over the upper and lower edges of the encircling protector in the manner illustrated in Fig. 5.

Among the practical features of advantage in the use of the latter fastening device, is this:—that when the ends of the protector are secured in this manner, *i. e.*, by the strip 8, the extending ears 9 when turned over the edges as described are amply strong to hold the device to the tree as desired and not yet so tight but that it will allow the end to slip through, or the device as a whole to compensate for the increased diametrical dimensions of the tree in future growth.

The device, as a whole, is preferably made of some paper pulp or board pressed, or otherwise formed, into the desired shape, and the whole surface, more particularly the underneath inside, coated with some material, such as a hard paint, to give to the same a hard, smooth surface to which the insects cannot take hold in trying to pass the same as in crawling from the tree around the same.

The principal feature of advantage inherent in making use of a paper board as the material from which to construct our protector is that, it is absolutely non-corrosive and, being protected by the coating of paint, is very lasting.

We claim:—

1. In a tree-protector, the combination with a split band, of a strip secured to one of the ends thereof, and ears formed on said strip adapted to be folded over the overlapping contiguous end of the split band: substantially as, and for the purposes described.

2. In a tree-protector, the combination with a split band provided with a circumferential groove in its upper edge, a packing secured in said groove, a metallic strip folded over and secured to one end of the band, and ears formed on said strip adapted to fold over and bind the other overlapping contiguous end of the split band: substantially as, and for the purposes described.

In testimony whereof we have affixed our signatures, in presence of two witnesses, this 8th day of April, 1892.

MICHAEL B. RYAN.
PLEASANT WARD.

Witnesses:
H. K. WAGNER,
W. M. BYRNE.